Aug. 3, 1954

W. H. PERCIVAL 2,685,173

EXPANSIBLE FLUID OR HEAT ENGINE

Filed March 23, 1950

Inventor
Woeth H. Percival
By
Willits, Helwig & Baillio
Attorneys

Patented Aug. 3, 1954

2,685,173

UNITED STATES PATENT OFFICE 2,685,173

EXPANSIBLE FLUID OR HEAT ENGINE

Worth H. Percival, Detroit, Mich., assignor to General Motors Corporation, Detroit, Mich., a corporation of Delaware Application March 23, 1950, Serial No. 151,359

3 Claims. (Cl. 60—59)

This invention relates to engines in which an expansible fluid is circulated in a closed conduit system consisting of a high temperature or hot conduit circuit, a low temperature or cold conduit circuit and an expanding and contracting chamber which may be formed by a cylinder and piston. Heat is absorbed by the high temperature or hot conduit circuit from an external source and heat is dissipated from the low temperature or cold conduit circuit to the surrounding medium or atmosphere. Some of the heat discharged by the engine into the cold conduit circuit is absorbed by a part of the hot conduit circuit and into which relatively cold expansible fluid is compressed by the engine on the compression stroke thereof. The engine may employ cylinders, pistons, valves, heat exchangers, compressors and other easily obtainable devices common to the combustion engine art.

It is an object of the present invention to take known heat exchangers and other devices which have been developed and which are now being employed in the internal combustion engine and other arts and to develop a modified form of closed cycle, externally heated, expansible fluid engine which can be successfully operated by the utilization of these known devices.

Other and further objects will be apparent from the following specification and the drawing, in which.

Figure 1:
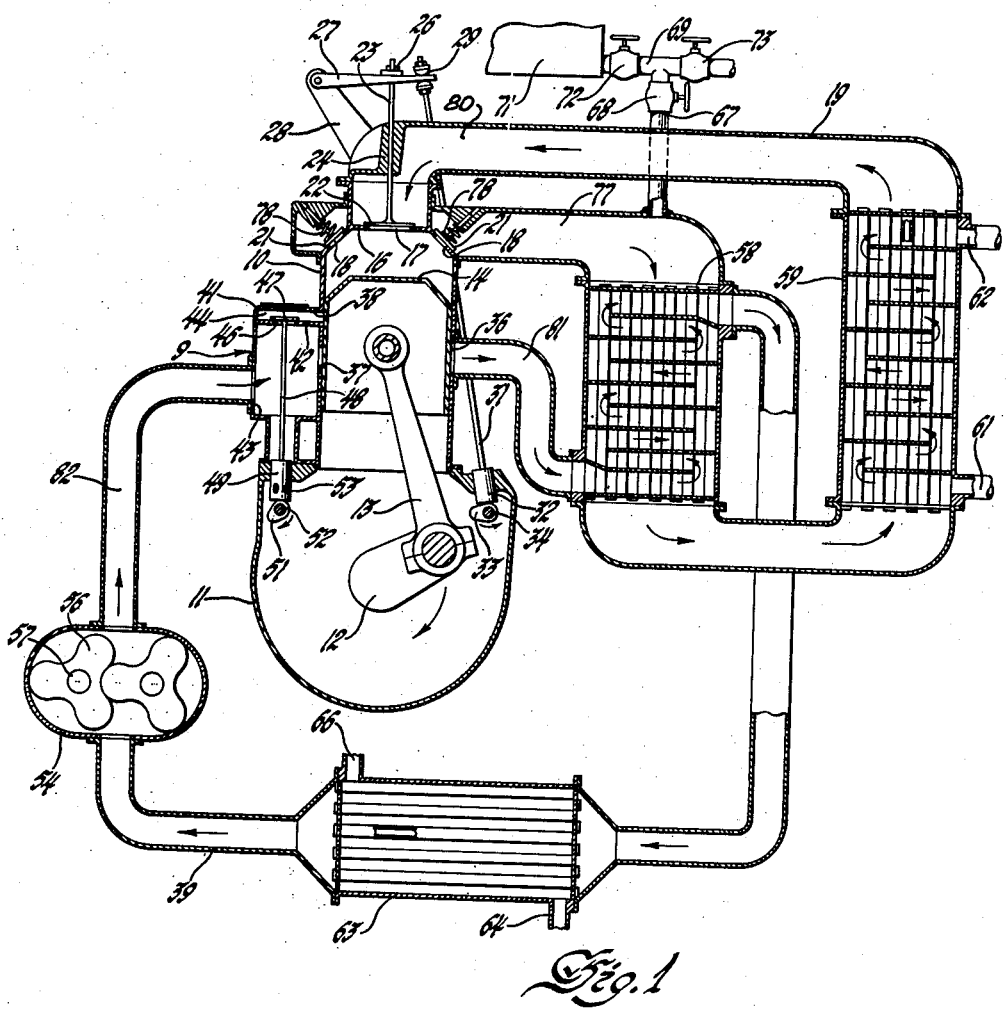
Figure 1 is a cross-sectional view diagrammatically illustrating a form of closed cycle, externally heated, expansible fluid engine embracing the principles of this invention.

Referring particularly to Figure 1, the engine 9, embracing the principles of the invention, comprises a cylinder 10 supported by a crankcase 11 and having a crankshaft 12 journaled therein for operation by a connecting rod 13 which in turn is connected to and operated by a piston 14 located in the cylinder 10. The cycle of operations employed by the engine 9 embraces an expansion stroke resulting from an outward movement of the piston 14 within cylinder 10, and, a compression stroke resulting from an inward movement of the piston 14 within the cylinder 10.

The head end 16 of the cylinder 10 has formed therein, ports indicated at 17 and 18 and between which ports a high temperature or hot fluid conduit circuit indicated at 19 is connected. The ports 18 are controlled by pressure operated spring pressed valves 21 while the port 17 is controlled by a mechanically operated valve indicated at 22. The valve 22 has a stem 23 movably supported in a boss 24 formed in an end portion of the conduit circuit 19, the opposite end of the stem being connected at 26 to a rocker arm 27 which is supported at one end by an arm 28 projecting from the upper part of the cylinder 10. The opposite end of the arm 27 is connected at 29 to a push rod 31 having a bearing member 32 slidably disposed in an opening formed in the crankcase 11. The push rod 31 is adapted to be operated by a cam 33 mounted upon a shaft 34 which is rotated in timed relation to the crankshaft 12.

At the lower end of its stroke, the piston 14 is adapted to uncover ports indicated at 36, 37 and 38 which are formed in the cylinder 10 intermediate the ends thereof. The port 36 is connected to the ports 37 and 38 by a low temperature or cold fluid conduit circuit indicated generally at 39. Part of the circuit 39 comprises a two-part chambered member 41 formed integrally with the cylinder 10 and at one side thereof. The member 41 has a partition 42 formed transversely thereof and dividing the interior of the member into chambers indicated at 43 and 44. Port 38 communicates with chamber 44 while port 37 communicates with chamber 43. The partition 42 has a port 46 which is formed therein between the chambers 44 and 43. The port 46 is controlled by a valve 47 operated by a stem 48 having an enlarged end 49 which is journaled in an opening formed in the crankcase 11. The end 49 engages and is operated by a cam 51 driven by a shaft 52 which is rotatably driven in timed relation to the rotation of the crankshaft 12. The enlarged end 49 is provided with an axially extending opening therein which at its lower end communicates with openings 53 through which the interior of the crankcase 11 is placed in open communication with the cold fluid conduit circuit 39.

In order to provide means positively tending to circulate the working fluid employed in the system and particularly in that part of the system included within the cold fluid conduit circuit 39, there is inserted intermediate the ends of the circuit 39 a compressor or blower 54 having co-acting impellers 56 mounted on shafts 57 which are driven in any suitable manner. The shafts 57 may, if desired, be driven by the crankshaft 12 and in any suitable timed relation thereto. The impellers 56 are adapted to rotate in such direction that the fluid in the conduit circuit 39 will tend to flow from the port 36 toward the ports 37 and 38. Crankcase compression also may be used instead of the blower 54, as is well known in the two-stroke cycle engine art.

The relation between the position of ports 36 and 37 is such that the port 36 will be opened upon the expansion stroke of the piston 14 a short time before the port 37 will be opened. Such opening of the ports 36 and 37 will first occur during the latter part of the expansion stroke of the piston 14 and will continue thereafter during the initial part of the compression stroke of the piston 14. The valve 47 is timed to open some time immediately after the beginning of the compression stroke of the piston 14 and the valve 47 will remain open during the further movement of the piston 14 and until approximately the time when the port 38 is closed by the piston 14.

In order to provide for the exchange of heat between the cold fluid conduit circuit 39 and the hot fluid conduit circuit 19, there is employed between the circuits a heat exchanger or regenerator such as that indicated at 58.

Also, in order to supply external heat to the hot fluid conduit circuit 19, there is employed therein a heater 59 having an inlet 61 and an outlet 62 through which heating fluid of any suitable kind may be applied externally to the fluid contained within the hot fluid conduit circuit 19.

In order to be able to dissipate heat from the cold fluid conduit circuit 39 after the fluid therein has passed through the heat exchanger 58, there is employed a second heat exchange device indicated at 63 and within which device water or other suitable coolant liquid may be admitted and discharged through inlet 64 and outlet 66. The heat exchanger 63 is so constructed that the coolant liquid employed therein will be applied externally with respect to the fluid circulating within the cold fluid conduit circuit 39.

In order to be able to control the speed of operation and the power of the engine 9, there is employed in the hot fluid conduit circuit 19, an outlet conduit 67 controlled by a valve 68 which in turn communicates with a conduit 69 communicating at one end with the atmosphere and at the other with a pressure tank 71. A valve 72 is employed in the conduit 69 between the tank 71 and the valve 68, and a second valve 73 is employed in the conduit 69 between the atmosphere and the valve 68.

The system can be filled with inert or other suitable gas contained at any suitable high pressure within the tank 71. For such purpose the valves 68 and 72 may be opened and the valve 73 closed. The pressure in the tank 71 should be retained at all times at some value higher than the pressure within the engine 9 during any operational event that may occur within the engine. After the engine has been filled with working fluid from the tank 71, the engine may be operated by applying heat to the heater 59, coolant fluid to the heat exchanger 63, and, by starting the rotation of the crank 12 and the operation of the blower 54.

Figure 2:
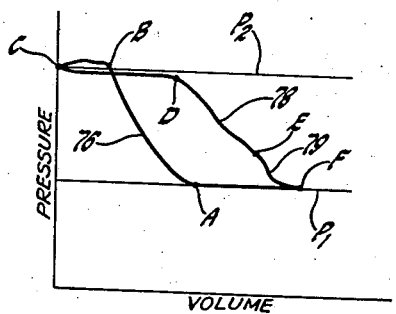
Figure 2 is a pressure indicator diagram illustrating the events of a single cycle of operations of an engine embracing the principles of the invention.

On the compression stroke of the engine, the piston 14 will compress within the cylinder 10 the working fluid supplied thereto by the ports 37 and 38. The compression so described will start at A and will proceeding according to the pressure line indicated at 76 in Figure 2. When the compression has proceeded to point B at the upper end of line 76, the valves 21 will open to discharge the fluid compressed within the cylinder, into the inlet end 77 of the hot fluid conduit circuit 19. The valves 21 will open under such circumstances when the pressure in the cylinder is great enough to overcome the force exerted by the springs 78 which are employed for the purpose of normally holding the valves in closed position. As the piston 14 reaches top dead center at C and thereupon completes the compression stroke of the engine and the heating of the charge due to compression, there will be discharged into the inlet 77 a comparatively cold and dense charge of working fluid which has been compressed to approximately the value indicated by the line $P_2$ in Figure 2. The pressure $P_2$ is any pressure selected as suitable for the high pressure limit for operating the engine 9.

Assuming the engine to have been operating for a considerable time, and that the fluid pressure within the hot fluid conduit circuit 19 has reached an equilibrium pressure at the value $P_2$, then, at the beginning of the expansion stroke and upon the opening of the valve 22, there will be discharged into the cylinder 10 a quantity of fluid at the pressure $P_2$, from the outlet end 80 of the fluid conduit circuit 19. The cam 33 is formed with a configuration such that the valve 22 will remain open during the expansion stroke of the piston 14 to a point indicated at D in the diagram illustrated by Figure 2. When the valve 22 closes at D, the fluid thus contained in the cylinder 10 will expand along the line indicated at 78 in Figure 2 and until the point E is reached. At such time the upper edge of the piston 14 will be adjacent the upper edge of the port 36. When the port 36 is opened, the fluid in the cylinder 10 will continue to expand along line 79 in Figure 2 and into the inlet end 81 of the cold fluid conduit circuit 39. Such expansion along line 79 will continue thereafter when port 37 is opened by a further movement of the piston 14 beyond the point E. Upon the opening of port 37, working fluid thereafter will flow into the cylinder 10 from the outlet end 82 of the cold fluid conduit circuit 39. The working fluid admitted through the port 37 will be deflected upwardly within the cylinder 10 by the piston 14 and will tend to flow about within the cylinder 10 to scavenge the cylinder of all of the expansible fluid previously employed in the performance of the expansion stroke of the piston 14. Such scavenging will continue at pressure $P_1$ through point F and will be discontinued at the point indicated at A in Figure 2. At point F the piston 14 will reach lower dead center position within the cylinder 10 and thereafter, during the initial part of the compression stroke of the piston 14, there will be a continuous flow of fluid through the cylinder and into the inlet end 81 of the cold fluid conduit circuit 39, and until the port 36 is closed.

Prior to the closing of the port 37, the valve 47 will be opened by the timed operation of the cam 51 and will remain open for admitting fluid during the initial part of the compression stroke of the engine until the port 38 is closed. The closing of the port 36 by the piston 14 will occur at point A on the indicator diagram illustrated by Figure 2. The piston 14 thereafter will continue on the compression stroke thereof to compress the cold and dense fluid so introduced into the cylinder from the cold fluid conduit circuit 39, as has been previously described.

The fluid which has been described as being discharged by the cylinder 10 into the inlet 81 of the cold fluid conduit circuit 39 and toward the end of the expansion stroke of the piston 14, will flow into the heat exchanger 59 and will tend to heat the relatively colder fluid in the heat exchanger which was discharged into the inlet 77 of the hot fluid conduit circuit 19 toward the end of the preceding compression stroke of the piston 14. Such heat exchange operation will be repeated in the heat exchanger 58 during each succeeding expansion and compression stroke of the piston 14 so that a large part of the heat of the fluid discharged at the end of each expansion stroke of the piston will be transferred by the heat exchanger 58 from the cold fluid conduit circuit 39 to the hot fluid conduit circuit 19. Hence the fluid in the hot fluid conduit circuit 19 will be reheated upon its passage through the heat exchanger 58 by the fluid discharged by the piston 14 into the cold fluid conduit circuit 39. Beyond the heat exchanger 58 the reheated fluid within the conduit circuit 19 will thereupon flow into the heater 59 where it will be further heated by the heating fluid introduced to the heater 59 by the inlet 61. Beyond the heater 59 the heated fluid within the conduit circuit 19 will continue to be impelled toward the valve 22 upon each succeeding stroke of the engine 9. Also upon each stroke of the engine 9 a new charge of relatively hot fluid will be expelled from the cylinder 10 into the cold fluid conduit circuit 39. In this circuit such successive charges will be cooled by passing through the heat exchangers 58 and 63 to be later readmitted to the cylinder through the ports 37 and 38 by operation of the blower or compressor 54. Such charges likewise will be successively compressed into the inlet 77 upon each compression stroke of the piston 14, where the fluid so received will be heated within the hot fluid conduit circuit 19 by operation of the heat exchanger 58 and the heater 59. Such fluid thereupon will be readmitted to the cylinder 9 from the outlet end 80 of the conduit circuit 19 upon each successive expansion stroke of the engine 9, where it will expand against and move the piston 14 for performing each successive working stroke of the engine 9.

In order to control the speed and power of the engine, it is necessary only to increase or decrease the total amount of fluid employed in operating the engine and contained at all times within the cylinder 10 and the conduit circuits 19 and 39. This may be done by manipulating the valves 68 and 72 for increasing the fluid within the system, by discharging therein additional quantities of fluid from the tank 71. Such increase in fluid within the system will provide a greater quantity of fluid for absorption of heat on the passage of the fluid through the heat exchanger 58 and the heater 59.

The speed and power of the engine may be reduced by manipulating valves 68 and 73 which will discharge some of the fluid in the system to the atmosphere, thereby reducing the quantity of fluid in the system to be so heated and expanded by the heat exchange devices employed in the conduit circuit 19.

I claim:

1. An expansible fluid engine comprising working chamber means having alternate expansion and compression strokes, fluid conduit means connected to said chamber and providing a hot fluid conduit circuit and a cold fluid conduit circuit, heat exchanging means between said conduit circuits, heating means for said hot fluid conduit circuit, unidirectional fluid circulating means for said cold fluid conduit circuit, means for controlling the admission of fluid during the initial part of said expansion stroke from one end of said hot fluid conduit circuit to said working chamber means, means for controlling the discharge of fluid during the latter part of said compression stroke from said working chamber means to the opposite end of said hot fluid conduit circuit, means for controlling the exhaust of fluid during the latter part of said expansion stroke from said working chamber means to one end of said cold fluid conduit circuit, and means for controlling the admission of fluid during the initial part of said compression stroke from the opposite end of said cold fluid conduit circuit to said working chamber means, said latter admission means including a pair of ports in said working chamber adapted to be closed during the initial part of the compression stroke, the first of said ports being in direct communication with said cold fluid circuit to introduce fluid into the working chamber, valve means intermediate the other port and the cold fluid circuit to allow fluid to flow into the working chamber after the first port is closed.

2. An expansible fluid engine comprising working chamber means having alternate expansion and compression strokes, fluid conduit means connected to said chamber means and providing a hot fluid conduit circuit and a cold fluid conduit circuit, fluid circulating means associated with said cold fluid conduit circuit, heat exchange means associated with said hot and said cold fluid conduit circuits, valve means in said working chamber means for admitting fluid from said working chamber means to the inlet for said hot fluid conduit circuit and for supplying fluid to said working chamber means from the outlet from said hot fluid conduit circuit, a plurality of port means associated with said cold fluid conduit circuit, and movable means for opening and closing said ports during the latter part of said expansion stroke and the initial part of said compression stroke, said port means including a first port uncovered by said movable means at the end of the expansion stroke to admit fluid from the cold circuit to the working chamber, a second port adapted to admit fluid from the cold fluid circuit to the working chamber after the movable means has covered said first port.

3. An expansible fluid engine comprising working chamber means having an expansion stroke and a compression stroke, fluid conduit means connected to said chamber means and providing a hot fluid conduit circuit and a cold fluid conduit circuit, fluid circulating means associated with said cold fluid conduit circuit, heat exchange means associated with said hot and said cold fluid conduit circuits, valve means in said working chamber means for admitting fluid from said working chamber means to the inlet for said hot fluid conduit circuit, and for supplying fluid to said working chamber means from the outlet from said hot fluid conduit circuit, a plurality of port means associated with said cold fluid conduit circuit, and movable means for opening and closing said ports during the latter part of said expansion stroke and the initial part of said compression stroke said port means including a first port uncovered by said movable means near the end of the expansion stroke to scavenge said working chamber, a second port for charging said working chamber during the initial compression stroke and after said first port has been covered by said movable means, said scavenging and charging events being actuated by working fluid moving in one direction in said cold fluid conduit circuit.

References Cited in the file of this patent

UNITED STATES PATENTS

| Number | Name | Date |
|---|---|---|
| 2,067,453 | Lee | Jan. 12, 1937 |
| 2,568,024 | Pfenninger | Sept. 18, 1951 |

FOREIGN PATENTS

| Number | Country | Date |
|---|---|---|
| 10,719 | Great Britain | May 10, 1904 |